United States Patent [19]
Brennesholtz et al.

[11] Patent Number: 4,914,511
[45] Date of Patent: Apr. 3, 1990

[54] PROJECTION COLOR TV USING CRTS HAVING INTERFERENCE FILTERS WITH DIFFERENT NUMBER OF LAYERS

[75] Inventors: Matthew S. Brennesholtz, Waterloo; Raymond G. Greene, Romulus, both of N.Y.

[73] Assignee: North American Philips Corporation, New York, N.Y.

[21] Appl. No.: 288,833

[22] Filed: Dec. 23, 1988

[51] Int. Cl.⁴ .......................... H04N 9/16; H04N 9/31
[52] U.S. Cl. ......................................... 358/60; 358/64; 313/478
[58] Field of Search ............................ 358/64, 60, 231; 313/474, 478

[56] References Cited
U.S. PATENT DOCUMENTS
3,946,267 3/1976 Lustig et al. ........................ 313/474
4,634,926 1/1987 Vriens et al. ........................ 358/253
4,679,069 7/1987 Andrea et al. ........................ 358/60
4,683,398 7/1987 Vriens et al. ........................ 313/474
4,807,014 2/1989 Van Gorkum et al. ............... 358/60

FOREIGN PATENT DOCUMENTS
0285224 10/1988 European Pat. Off. ............ 313/474

Primary Examiner—Howard W. Britton
Assistant Examiner—Kim Yen Vu
Attorney, Agent, or Firm—John C. Fox

[57] ABSTRACT

The variation in center-to-edge luminance gradient along the minor axis of the red-emitting and/or blue-emitting tube having a multilayer interference filter, is reduced by reducing the number of layers in the filter making it easier to match the gradients to that of the green-emitting tube, and thereby improve the white field uniformity of a projection color TV employing three monochrome cathode ray tubes.

6 Claims, 3 Drawing Sheets

U.S. Patent  Apr. 3, 1990  Sheet 1 of 3  4,914,511
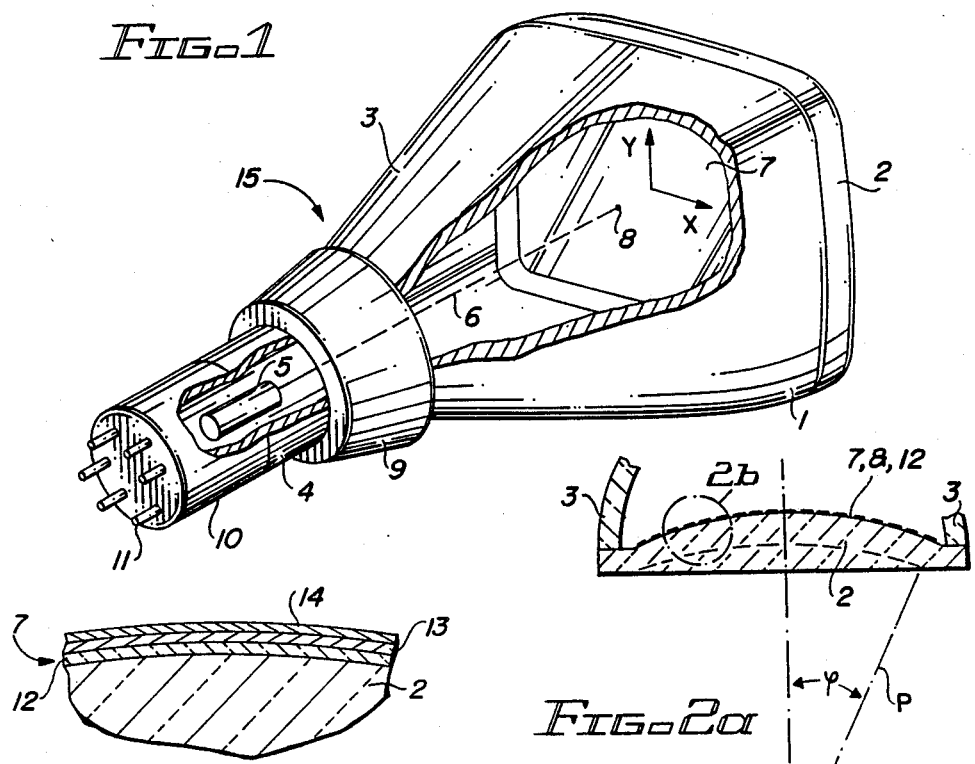
FIG-1
FIG-2a
FIG-2b
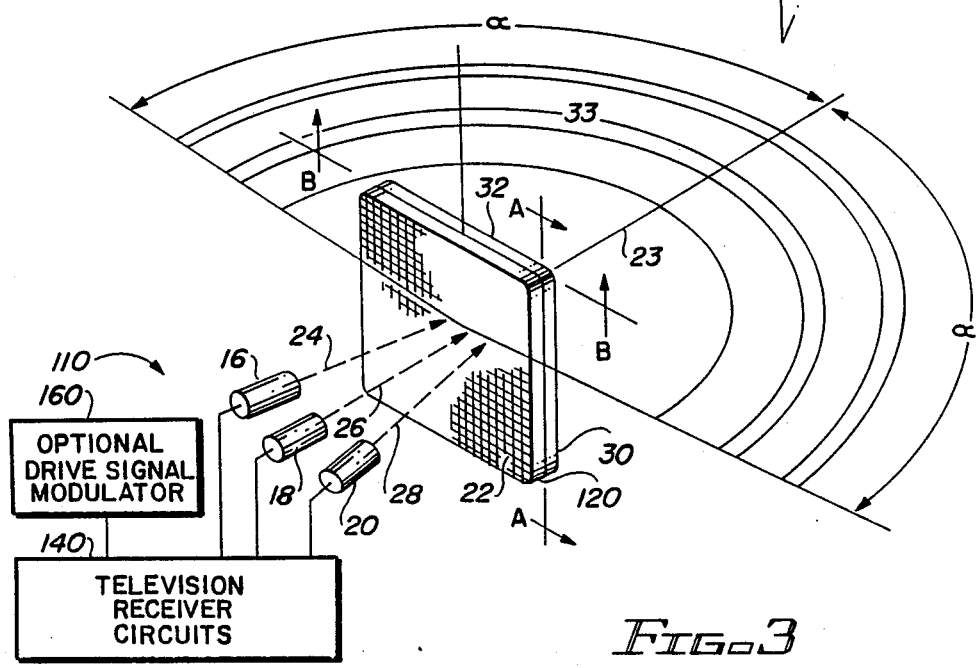
FIG-3

PROJECTION COLOR TV USING CRTS HAVING INTERFERENCE FILTERS WITH DIFFERENT NUMBER OF LAYERS

CROSS-REFERENCE TO RELATED APPLICATION

Co-pending U.S. patent application, Ser. No. 289,338, filed concurrently herewith, relates to projection color television (TV) using monochrome cathode ray tubes (CRTs), at least one of which has an interference filter, while the present Application relates to such TV using such CRTs, at least two of which have interference filters with different numbers of layers.

BACKGROUND OF THE INVENTION

This invention relates to projection color television (TV) display devices using monochrome cathode ray tubes (CRTs) incorporating interference filters, and more particularly relates to a method for improving the white field uniformity of these devices, and to the resulting devices and tubes.

Monochrome cathode ray tubes for projection television employ a single electron gun mounted in the neck of the tube to focus a single electron beam on the fluorescent display screen of the tube. A deflection yoke surrounding the neck of the tube, and associated electronic circuitry, cause the beam to scan the screen as well as to vary in intensity in response to a video signal to produce a monochrome display image.

In projection color television, three such displays, each in one of the primary colors red, blue and green, are superimposed on a large projection screen to produce a full color display image. Because the images on the individual tube screens are not viewed directly, but are magnified and projected by a system of projection lenses, the individual cathode ray tubes are driven at higher loads than would be encountered for direct view tubes, in order to produce a full color display of acceptable brightness.

Projection tubes having an interference filter are described in U.S. Pat. No. 4,634,926, assigned to U.S. Philips Corporation. The filter, herein referred to as a short wave pass (SWP) filter, is composed of alternating layers of materials of high and low refractive index. The filter is designed to result in a marked increase in luminous efficiency of the tube in the forward direction, as well as improved chromaticity and contrast. Even further improvements are provided, especially in light gain in the corners of the display screen, by combining such an interference filter with an inwardly curved display window, as provided in U.S. Pat. No. 4,683,398, also assigned to U.S. Philips Corporation.

Such tubes with interference filters, while exhibiting a marked increase in luminous efficiency in the forward direction, as well as improved chromaticity and contrast, also exhibit greater luminance in the center than at the edges of the display, referred to herein as center-to-edge luminance gradient, particularly along the minor or y axis of the tube.

Furthermore, uncontrollable variations in the thicknesses of the filters occurring during mass production of these tubes can result in edge luminances which vary from tube to tube from as low as about 30 to as high as about 70 percent of the center luminance. When the red, blue and green tubes are assembled into a projection color television, the tube drivers are adjusted to result in a desired white field at the center of the screen. It can be appreciated that when red, blue and green tubes having different center-to-edge gradients are combined in a projection set, white field uniformity is increasingly degraded as the distance from the center of the screen increases.

In co-pending patent application Ser. No. 289,388, filed concurrently herewith, the white field uniformity of such a projection color television display device employing at least one monochrome tube with an interference filter is improved by altering the center-to-edge luminance gradient of at least one of the projection tubes to match that of at least one of the other tubes. For example, the luminance gradient of the red tube is altered to match that of the green tube, such as by applying an optical filter to the outside surface of the display window, the filter having varying transmission from center to edge. Since the uncontrollable thickness variations result in a range of center-to-edge gradients for the red and/or blue tube, custom matching on a tube-for-tube basis is required.

OBJECTS AND SUMMARY OF THE INVENTION

It is a principal object of the invention to reduce the range of variation of center-to-edge gradients along the minor axes of the red and blue tubes, so that gradient matching to the green tube can be carried out with less variation in the matching means.

In accordance with the invention, it has been discovered that the range of variation in center-to-edge luminance gradients along the minor axes of red and/or blue CRTs with interference filters for projection color TV can be significantly reduced without significantly reducing the brightness of the projection TV display, by reducing the number of layers in the filters.

According to the invention, the red and/or blue tube of a three-tube projection color TV is provided with an interference filter having a smaller number of layers than the filter of the green tube, enabling matching of the red and/or blue tube to the green tube over a smaller range of center-to-edge gradients.

According to a preferred embodiment, the filters of the red and/or blue tube have 14 layers, while the filter of the green tube has 20 layers.

According to another preferred embodiment, the TV includes means for matching the center-to-edge gradients of the red and/or blue tube to that of the green tube, whereby improved white field uniformity is obtained.

BRIEF DESCRIPTION OF THE DRAWINGS

FIG. 1 is a perspective view, partly in section, of a projection television display tube of the prior art;

FIG. 2a is a diagrammatic cross-section of a portion of the front of the display tube, showing the display window, luminescent screen and interference filter of the invention;

FIG. 2b is a detailed cross-section of a portion of the window, screen and filter of FIG. 2a;

FIG. 3 is a diagrammatic representation of a three-tube color projection television of the invention incorporating at least two display tubes having interference filters with different numbers of layers;

DESCRIPTION OF THE PREFERRED EMBODIMENT

Figure 4:
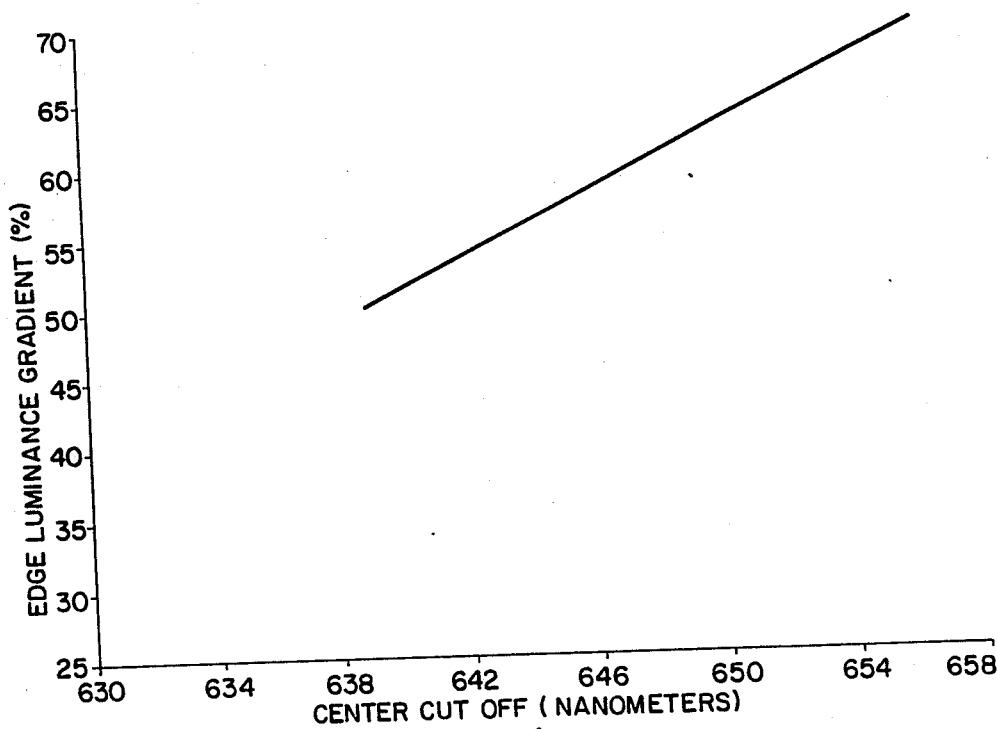
FIG. 4 is a graph of major and minor edge luminances as percents of center luminance at the projection screen versus center cutoff of a 20 layer interference filter in a red CRT.

FIG. 1 is a perspective view, partly broken away, of a projection television display tube 15 according to the prior art. The tube comprises a glass envelope 1 which consists of a display window 2 having an inwardly curved inside surface, a cone 3, and a neck 4, within which is an electron gun 5 for generating an electron beam 6. The electron beam is focused on a curved display screen 7, provided on the inside of the display window 2 to form a spot 8. The electron beam is deflected over the display screen 7 in two mutually perpendicular directions along X, Y, axes (sometimes referred to as the major and minor axes, respectively), by means of a system of deflection coils 9. Electrical connection to the gun 5 is provided through base 10 with connection pins 11.

FIG. 2a is a partial sectional view of the curved display window 2, the multi-layer interference filter 12, and the curved display screen 7. As seen in the more detailed FIG. 2b, the display screen 7 consists of a layer of luminescent material (phosphor) 13 and a thin aluminum film 14. The display window in the preferred embodiment is preferably as near spherical as possible, having a radius of curvature $\phi$. Other embodiments include aspherical shapes.

The details of the filter design are known from the teachings of U.S. Pat. Nos. 4,683,398 and 4,634,926 cited above, and are therefore not a necessary part of this description. Briefly, the filter comprises alternating layers of low refractive index and high refractive index materials, such as $SiO_2$ and $TiO_2$ having refractive indices of 1.44 and 2.35 respectively, preferred for their hardness and durability. The average optical thickness of the layers, which is equal to the physical thickness times the index of refraction of the layer, is approximately equal to 0.25 $\lambda f$, where $\lambda_f$ is the central or cut-off wavelength of the filter, which in turn is equal to $p \times \lambda$, where p is an interger having a value between 1.18 and 1.32 and is the central wavelength of the phosphor. These layers are typically formed by vapor deposition directly on the inner surface of the glass face panel until a total of from 14 to 20 layers have been deposited, increasing numbers of layers resulting in increased definition of the cut-off wavelength of the filter.

In addition to a short wave pass (SWP) filter of the type described above, the interference filter may also be in the form of a band pass (BP) filter in accordance with the teachings of copending patent application Ser. No. 217,259, filed July 11, 1988, Attorney's Docket No. SEPHA 60,067, assigned to the assignee of the present application.

A conventional 3-tube color projection television device is shown diagrammatically in FIG. 3, employing a rear projection screen 120. Video signals are received by television receiver circuits 140 and are projected through individual red, green and blue cathode ray tube (CRT)/lens projector assemblies 16, 18, and 20, onto the rear surface 22 of projection screen 120. The three CRT/lens projector assemblies 16, 18 and 20 each include a CRT and associated projection optics, and are arranged horizontally with respect to screen 120. The green assembly 18 is located so as to have its optical axis 26 coincide with the central projection axis, while the red and blue assemblies 16 and 20, having optical axes 24 and 28 respectively, are laterally and angularly offset from the green axis 26.

As already stated, uncontrollable variations in the thicknesses of the filters occurring during mass production of tubes can result in edge luminances which vary as much as about 30 to 70 percent of the center luminance. The most difficult to control in this respect is the green SWP filter used in conjunction with a Tb-activated phosphor. By way of example, for such a filter having 20 layers and a central wavelength of about 548 nanometers, the optical thickness is only about 2.7 microns, and the physical thickness is about 1.4 microns. Controlling this thickness to within + or −1 percent still results in a minor axis edge luminance of about 55+ or −5 percent of center luminance. In addition, for a given center luminance, the edge luminance of the green tube is typically lower than that of the red tube, with the result that when a three-tube projection set is adjusted at the screen center for a desired white field, the edge of the field has a magenta color. This nonuniformity of the white field becomes commercially unacceptable as the difference between edge luminances of the two tubes exceeds about 5 percent.

White field uniformity from center-to-edge can be improved by matching, to within at least 5 percent, the center-to-edge luminance gradients of the tubes for a projection set, as described in related co-pending U.S. application, Ser. No. 289,338, referred to above. As explained in the co-pending Application, it is normally preferred to match gradients of the red and/or blue tube to that of the green tube.

A technique which is attractive from the standpoint of flexibility and convenience of application is the silk screening of a half tone pattern, such as dots of varying size and/or spacing, onto the outside of the faceplate of the tubes. A set of several silk screens representing 5 percent increments of center-to-edge gradients will allow matching of tubes over the entire range of gradients likely to be encountered.

It is apparent that being able to reduce the range of variation in center-to-edge luminance gradients along the minor axes of the red and blue tubes is advantageous in that less variation is then required in the means for matching the gradients of these tubes to the green tube. For example, in the silk screening technique just described, a smaller set of screens would be required.

In accordance with the invention, it has been discovered that the range of variation in center-to-edge luminance gradients of the red and blue filters decreases with decreasing numbers of filter layers. FIG. 4 is a graph of luminance gradient at the edges of a projection TV screen at the major and minor axes expressed as a percent of luminance at the center of the screen versus the center cutoff of the filter in nanometers. Center cutoff wavelength is defined as the wavelength where 50% transmission occurs. The thickness of the filter is directly related to the cutoff of the filter since the optical thickness of each layer is approximately equal to 0.25 $\lambda f$, where $\lambda$ cutoff wavelength. For the 20 layer red filter, the luminance gradient at the screen edge ranges from about 50% at about 638.5 nanometers up to about 70% at 656 nanometers, resulting in a slope of about 1.14.

Figure 5:
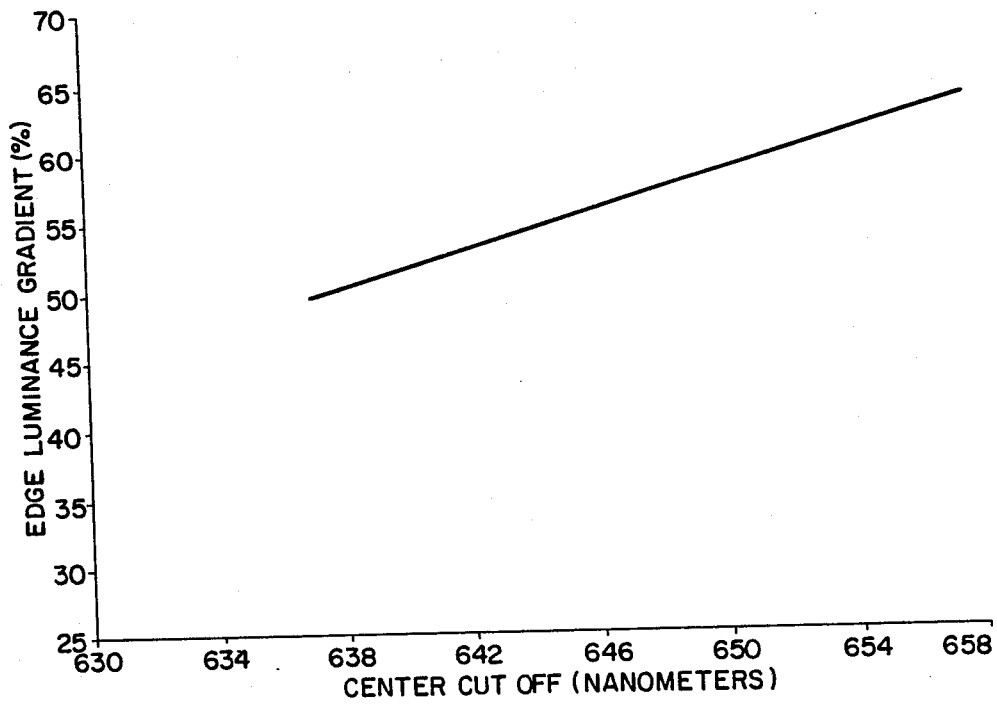
FIG. 5 is a graph similar in all respects to that of FIG. 3 for a 14 layer filter in a red tube.

FIG. 5 is a graph similar in all respects to that of FIG. 4 except that the filter is a 14 layer red filter rather than a 20 layer red filter. As may be seen from the Figure, the slope of the line is significantly smaller than the corresponding slopes for the 20 layer filter, that is, about 0.66, a significant decrease.

Figure 6:
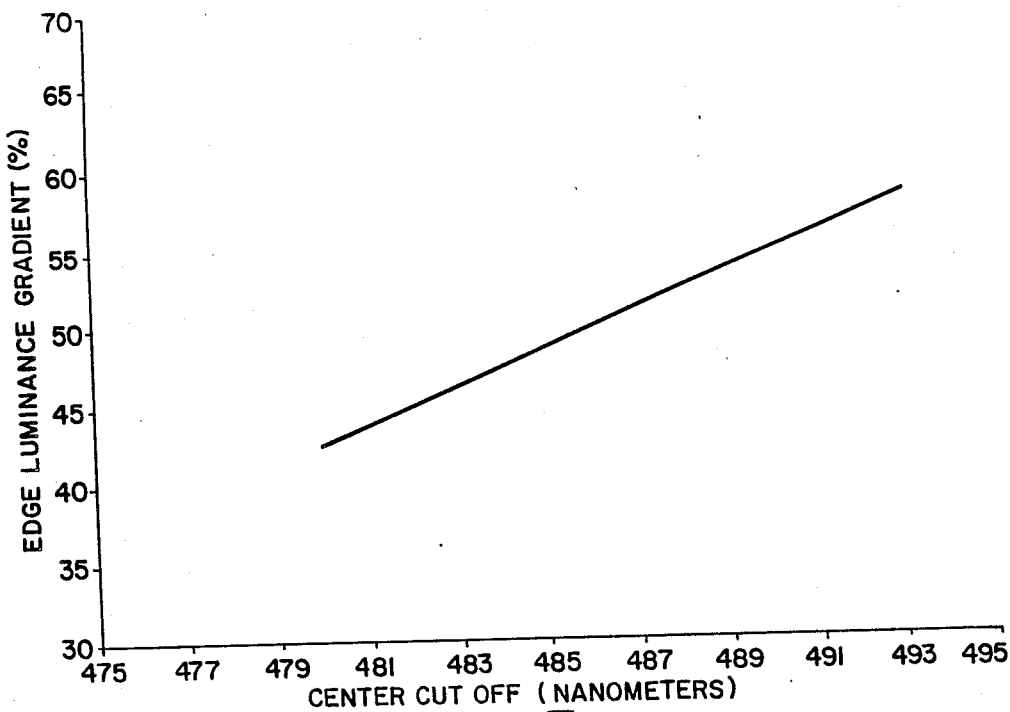
FIGS. 6 and 7 are graphs similar to FIGS. 3 and 4 for 20 and 14 layer filters in a blue tube, respectively.
Figure 7:
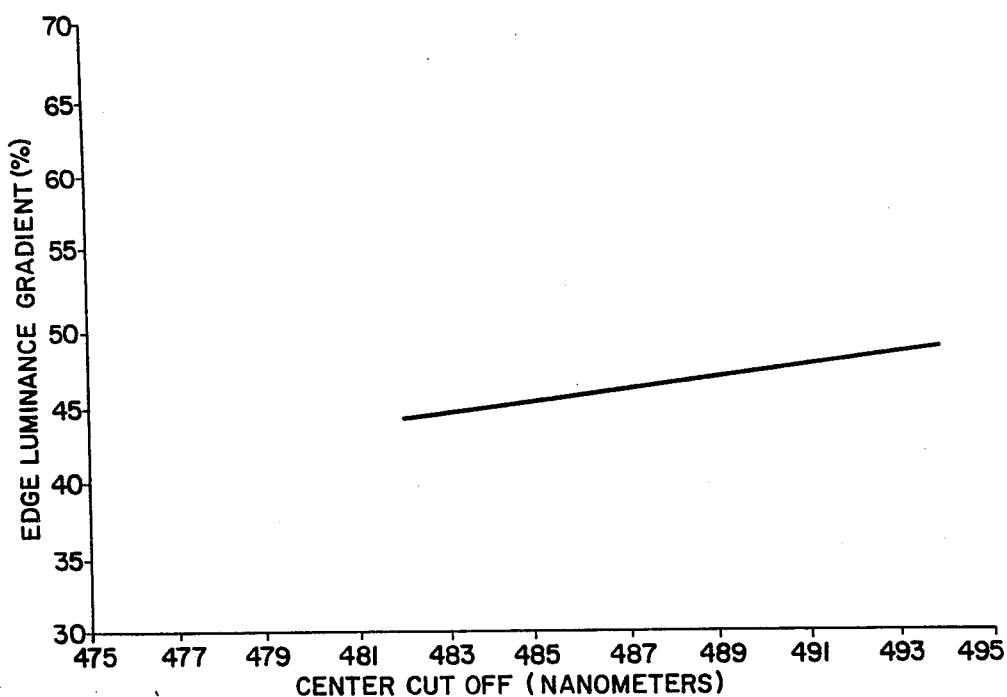

FIGS. 6 and 7 show similar graphical presentations of the relationship between luminance gradient and center cutoff for a 20 layer blue filter and for a 14 layer blue filter, respectively.

For the 20 layer blue filter (FIG. 6) the edge luminance gradient ranges from about 42.5 percent at 480 nanometers to about 58 percent at 493 nanometers resulting in a slope of about 1:19. For the 14 layer blue filter (FIG. 7), the edge luminance gradient ranges from about 44 percent at 482 nanometers to about 48 percent at 494 nanometers, resulting in a slope of about 0.33, a significant decrease.

We claim:

1. A three-tube color projection television display device having red, blue and green emitting monochrome cathode ray display tubes, the tubes each comprising in an evacuated envelope a display screen on the inside of a display window in the wall of the envelope, said display screen comprising a layer of a luminescent material, and a multi-layer interference filter between the luminescent material layer and the display window, means for altering the center-to-edge luminance gradient of at least one of the tubes in order to match the luminance gradient of the tube to that of one of the other tubes, characterized in that the interference filter of the red and/or blue filter has a smaller number of layers than the filter of the green tube.

2. The projection television display device of claim 1 in which the filter of the green tube has 20 layers.

3. The projection television display device of claim 2 in which the filter of the red tube has 14 layers.

4. The projection television display device of claim 2 in which the filter of the blue tube has 14 layers.

5. The projection television display device of claim 1 in which gradient altering means are included for the red emitting tube.

6. The projection television display device of claim 1 in which the gradient altering means are included for the blue emitting tube.

* * * * *